(12) United States Patent
Kudo

(10) Patent No.: US 7,246,033 B1
(45) Date of Patent: Jul. 17, 2007

(54) PEDOMETER FOR PETS

(76) Inventor: Susan Leeds Kudo, 210 Mantua Rd., Pacific Palisades, CA (US) 90272

( * ) Notice: Subject to any disclaimer, the term of this patent is extended or adjusted under 35 U.S.C. 154(b) by 0 days.

(21) Appl. No.: 11/374,445

(22) Filed: Mar. 13, 2006

(51) Int. Cl.
*G01C 22/00* (2006.01)
*G01B 5/02* (2006.01)
*G06F 15/00* (2006.01)

(52) U.S. Cl. .................................... 702/160; 702/153

(58) Field of Classification Search ................ 702/160, 702/57, 75, 77, 94–97, 141, 149, 150, 152, 702/153, 158, 182, 188; 482/3, 8, 9
See application file for complete search history.

(56) References Cited

U.S. PATENT DOCUMENTS 6,298,314 B1 * 10/2001 Blackadar et al. .......... 702/178
6,356,856 B1 * 3/2002 Damen et al. .............. 702/160
2006/0020421 A1 * 1/2006 Darley et al. ............... 702/182
2006/0025282 A1 * 2/2006 Redmann ....................... 482/8

* cited by examiner

*Primary Examiner*—Bryan Bui
(74) *Attorney, Agent, or Firm*—Abraham N. Seidman (57) ABSTRACT

An exercise monitoring pedometer for pets is directed toward measuring a pet's exercise over some, period of time, such as a day or week or month. The pet pedometer includes a solid state three-axis accelerometer, a signal processing unit, a CPU, a memory chip and a display with settable controls, and may include a voice recorder/player; or these functions may reside mainly on an application specific integrated circuit. The settable controls are directed toward providing a setting for pet stride size for conversion for walking and running, and for manual resetting. The pet pedometer auto-selects automatically for a pet's stride both a walking stride and a running stride. The present invention may also contain a recorder, typically a solid state recorder, which provide for a recording of the pet "owner's" voice, or selected music, so that the owner may record encouragement, etc., to his/her pet.

21 Claims, 11 Drawing Sheets

PEDOMETER FOR PETS

FIELD OF THE INVENTION

This invention relates to animal accessories, such as accessories for pets, in general. This invention relates to pet accessories for dogs.

This invention relates to pedometers where there are additional sources of the impact of a subject wearing the pedometer device other than that induced by the walking or running motion of the subject

BACKGROUND OF THE INVENTION

Pedometers, in general, have a long history, with continued patented improvements appearing from time-to-time. For example, "Pedometer with game mode", (U.S. Pat. No. 6,302,789, Harada, et al., Oct. 16, 2001) is designed for getting children to get exercise by walking and running.

The "Exercise support instrument," (U.S. Pat. No. 6,705,972, Takano, et al., Mar. 16, 2004), is designed to enhance a person's exercise program. A display for this device may contain a virtual animal, such as a dog; however, this is only a representation of a level of exercise achievement.

In "Pedometer for detecting vibrations in the motion direction," (U.S. Pat. No. 6,836,524, Lee, Dec. 28, 2004), a vibration detector uses frequency filtering to filter out unwanted frequency vibrations of pace detector, while set to detect low level signals.

Takenaka (U.S. Pat. No. 6,254,513, Jul. 2, 2001) describes the use of two piezo-electric sensors suspended on levers, together with an angle of inclination sensor.

Lynch (U.S. Pat. No. 6,698,381, Mar. 2, 2004 describes the use of a sound chip and a speaker to have "Pet Accessories" emit prescribed sounds interactively, upon a pet completing an electrical circuit in pet accessory.

In the case of providing a measuring pedometer for a pet, such as a dog, there are additional considerations. First, one wishes to measure the exercise obtained by the pet while walking and running, but not by other motions which might otherwise register as a "step" on a pet pedometer. Second, pets, such as dogs, have different sizes, such as small, medium and large; it would be desirable to have one pet pedometer which can be set for different size pets. Third, it is desirable to have a lightweight, low cost, rugged pet pedometer. An additional desirable feature might include a recording of the pet "owner's" voice, to encourage or direct the pet, such as a dog, in its exercise activities.

SUMMARY OF THE INVENTION

The present invention, an exercise monitoring pedometer for pets, such as dogs, is directed toward measuring a pet's exercise over some, period of time, such as a day or week or month.

The pet pedometer comprises a solid state three-axis accelerometer, a signal processing unit, a CPU, a memory chip and a display with settable controls, and may comprise a voice recorder/player; or these functions may reside mainly on an application specific integrated circuit.

The settable controls are directed toward providing a setting for pet stride size for conversion for walking and running, and for manual resetting. The pet pedometer auto-selects automatically for a pet's stride both a walking stride and a running stride. The data may be retained for a longer period of time as a recallable data set, so that for a period of one day, the pet pedometer may reset itself after each day, for example at midnight, but have the previous n days recallable, where n may be 3, 5, 7, 14 or the previous weeks' averages or monthly averages going back for a year which may be selected for display on a display unit, such an LCD display.

The present invention performs the functions of selecting a virtual vertical axis and selecting out, from the pet's actual walking and running, dominant frequencies applicable when the pet is walking and running.

The present invention may also contain a recorder, typically a solid state recorder, which provide for a recording of the pet "owner's" voice, or selected music, so that the owner may record exercise directions, encouragement, or a soothing reassurance to his/her pet, such as dog.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF PREFERRED EMBODIMENTS

The following description is of preferred embodiments presently contemplated for carrying out the invention. This description is not to be taken in a limiting sense, but is merely made for the purpose of describing the general principles of the invention.

Figure 1A:
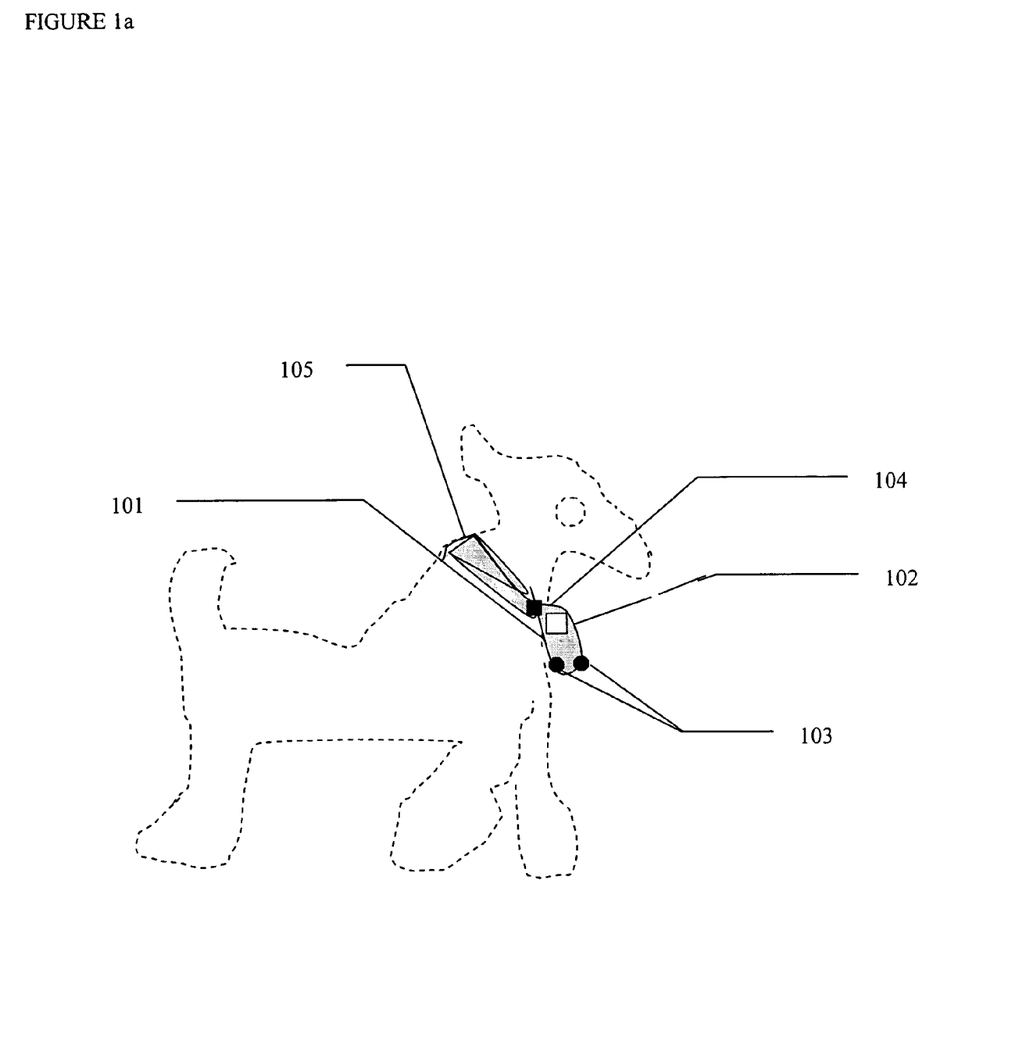
FIG. 1a shows the pet pedometer with an attachable device shown as attached to a pet's collar. The pet is shown in outline and is not part of the invention.

FIG. 1a shows a preferred embodiment of the pet pedometer in its case 101 with a display 102 and settable controls 103. The pet pedometer case 101 is disposed to receive an attaching device 104 which allows for attaching the pet pedometer to a pet collar 105. The pet is shown in outline and is not part of the invention.

Figure 1B:
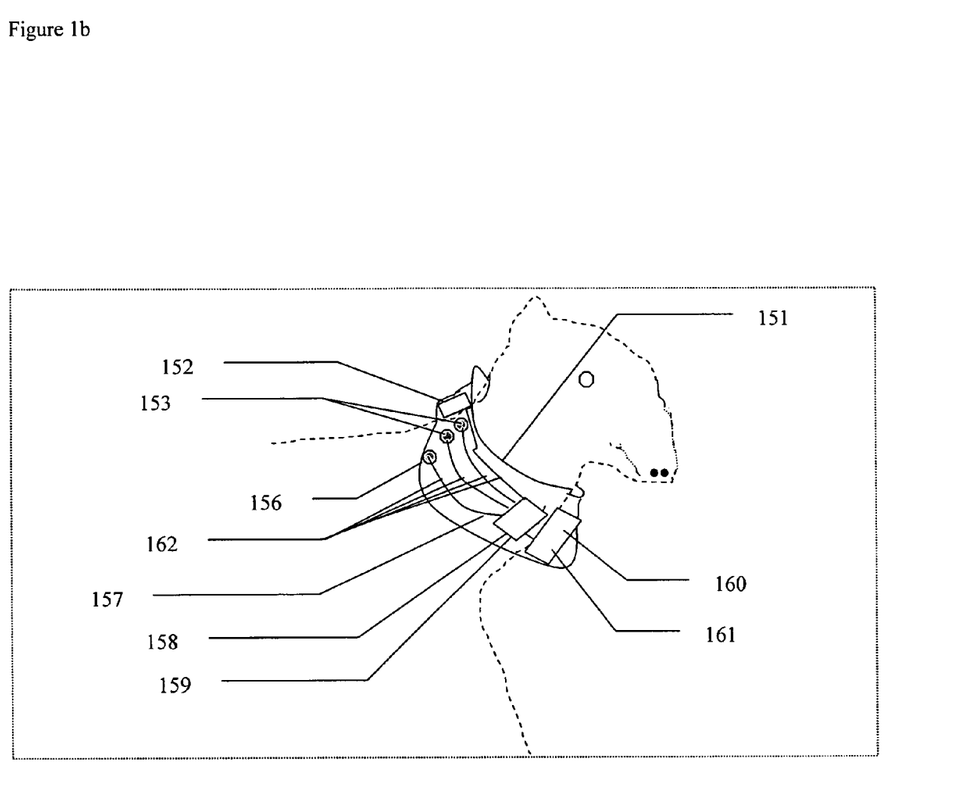
FIG. 1b shows the pet pedometer integrated into a pet collar. The pet is shown in outline and is not part of the invention.

FIG. 1b shows a preferred embodiment of the pet pedometer integrated into a pet collar 151, where the display 152 and settable controls 153 may be on the "top" of a pet collar 151 with a microphone/speaker unit 156 and the remainder of the pet pedometer, including accelerometer unit 157, sensor, digital signal processing/CPU unit 158, memory unit 159, remainder of control unit 160 and sound recording unit 161, are electrically connected by wires 162 embedded into the pet collar 151. The pet is shown in outline and is not part of the invention.

Figure 1C:
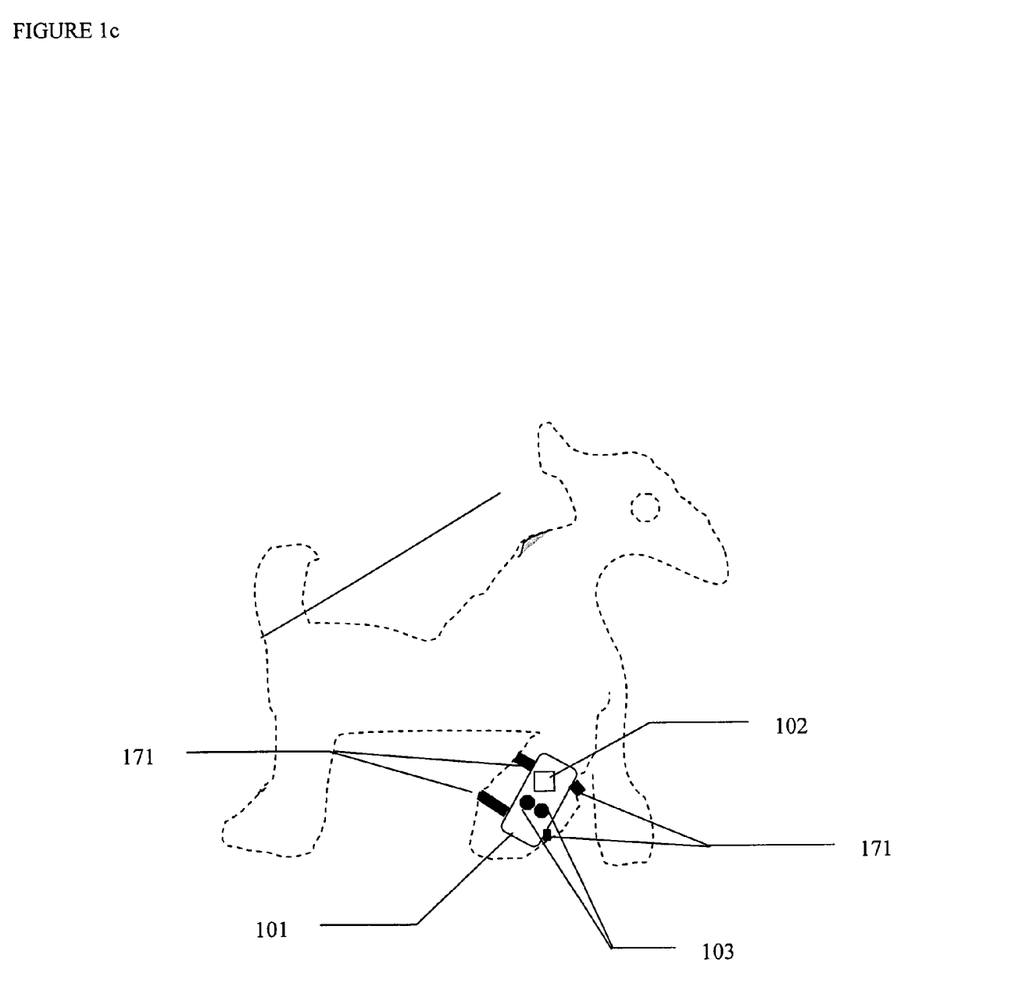
FIG. 1c shows the pet pedometer mounted on a pets front paw or front leg.

FIG. 1c shows a preferred embodiment of the pet pedometer placed on the paw or front leg of the pet, such as a dog. This embodiment of the pet pedometer is shown in its case 101 together with its display 102 and settable controls 103. Attaching means 171, such as elastic bands, for example, act to secure the pet pedometer 101 in place on a pet's leg or on top of the pet's paw.

Figure 2A:
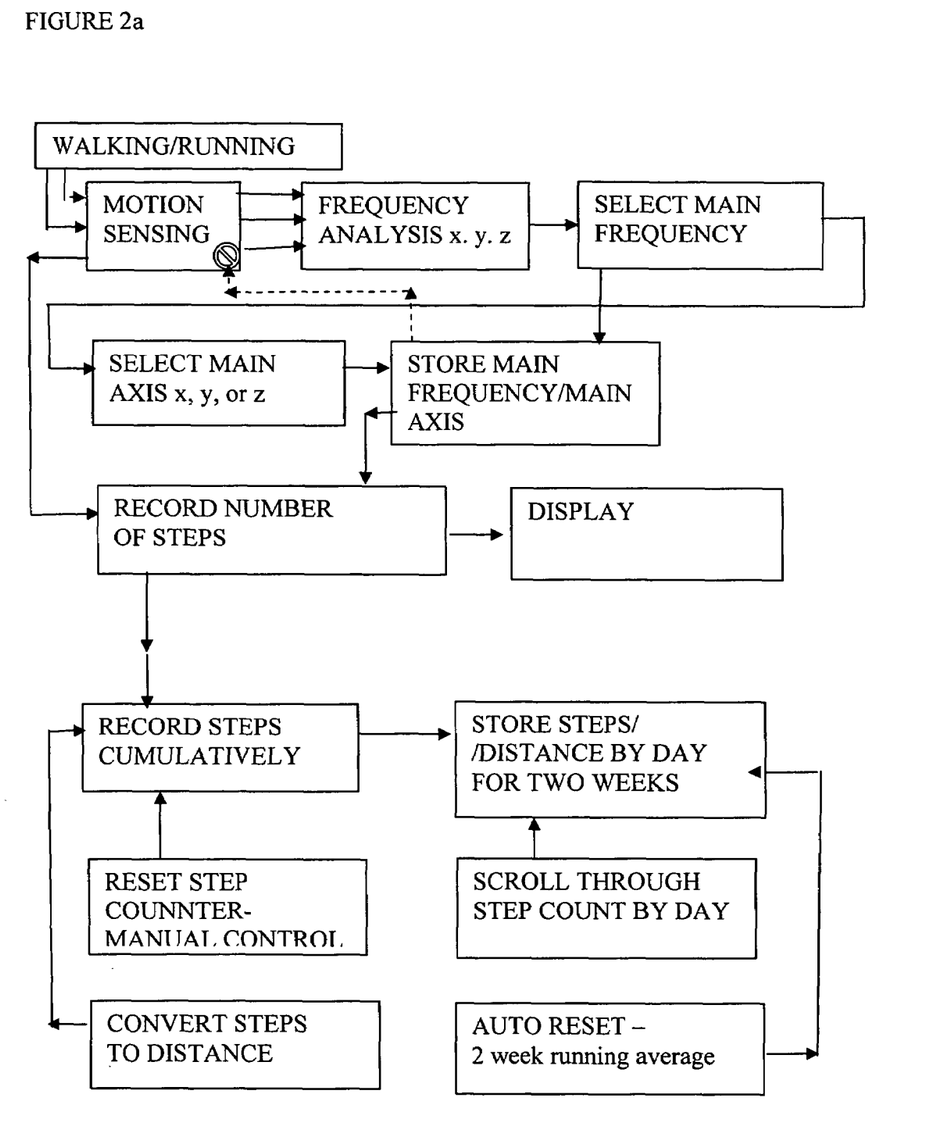
FIG. 2a shows a functional block diagram with exemplary functions; activities.

FIG. 2a is a block flow diagram for an embodiment of the pet pedometer. The sensor part of the pedometer is a three-axis accelerometer 201. The analog output from the three-axis accelerometer 201 is amplified and conditioned by the signal amplifier and signal conditioner 202.

The signal conditioner 202 also performs analog to digital (A/D) conversion. The digitized output from the signal conditioner/amplifier/digitizer 202 is input to a digital processor (CPU/controller) 203 which processes the digitized data from the 3-axes accelerometer 201.

The CPU 203 performs fast Fourier transforms (FFT's), in one embodiment, on the three-axes accelerometer 201 output data, and ranks the largest amplitude components, while a pet is walking, and then when a pet is running. By ranking the amplitudes, a largest amplitude may be selected out as the amplitude to be associated with walking and with running. For the case where the pet may be rolling around, then the CPU 203 detects additionally sporadic much higher or much lower frequencies from the accelerometer, so that no record of a step by the pet is made. Similarly, when the "walking" frequency is detected, a stride length is associated with that "walking" step. When a "running" frequency is detected, a stride length is associated with that "running" step. Thus an auto-selection, independent of any a priori knowledge of pet size, is performed by a preferred embodiment of the pet pedometer.

The Display Functions 204 includes automatic functions such as displaying the up-to-present number of steps, or distance, or both, traveled since last reset; and may include automatic resetting of the display to a zero display every 24 hours, at midnight, for example. In an embodiment, display functions 204 also include manual functions 205, such as a manually controlled review of the daily steps/distance from the previous 7 or 14 days. Similarly an embodiment provides for a manual review of monthly averages of the past 12 months, month-by-month. The monthly averages are computed automatically and are stored for display; a manual operation displays these automatically obtained monthly averages.

Manual control functions 205, in an embodiment, as examples, include setting up of the pedometer display, zeroing the pedometer display, reviewing previously acquired data, setting date and time, manually operating a recording of an owner's, or other's voice, and setting playback options for the owner's voice. Other manual functions are incorporated into other embodiments of the invention. The manual functions mentioned above are exemplary and may be supplemented.

Memory Functions 206 include string fixed parameters, storing acquired parameters and storing voice recordings of the pet owner's, or others, voice, or music.

Voice Functions 221, in an embodiment, include digital recording 222, utilizing a recording transducer function 224, a playback function utilizing a playback transducer function FIG. 225. In one embodiment, the voice function includes an analog to digital conversion function 221 for recording and a digital to analog conversion 221 for playback. In another embodiment, the voice functions 221 are carried out as part of the digital [processing functions 203, as indicated by the heavy dit-dash double ended arrow between voice functions 221 and digital processing/control functions. Similarly, in an embodiment, the voice recording storage voice function is carried out as part of the memory function 206, as indicated by the heavy dit-dash double ended arrow between voice functions 221 and memory functions 206.

Figure 2B:
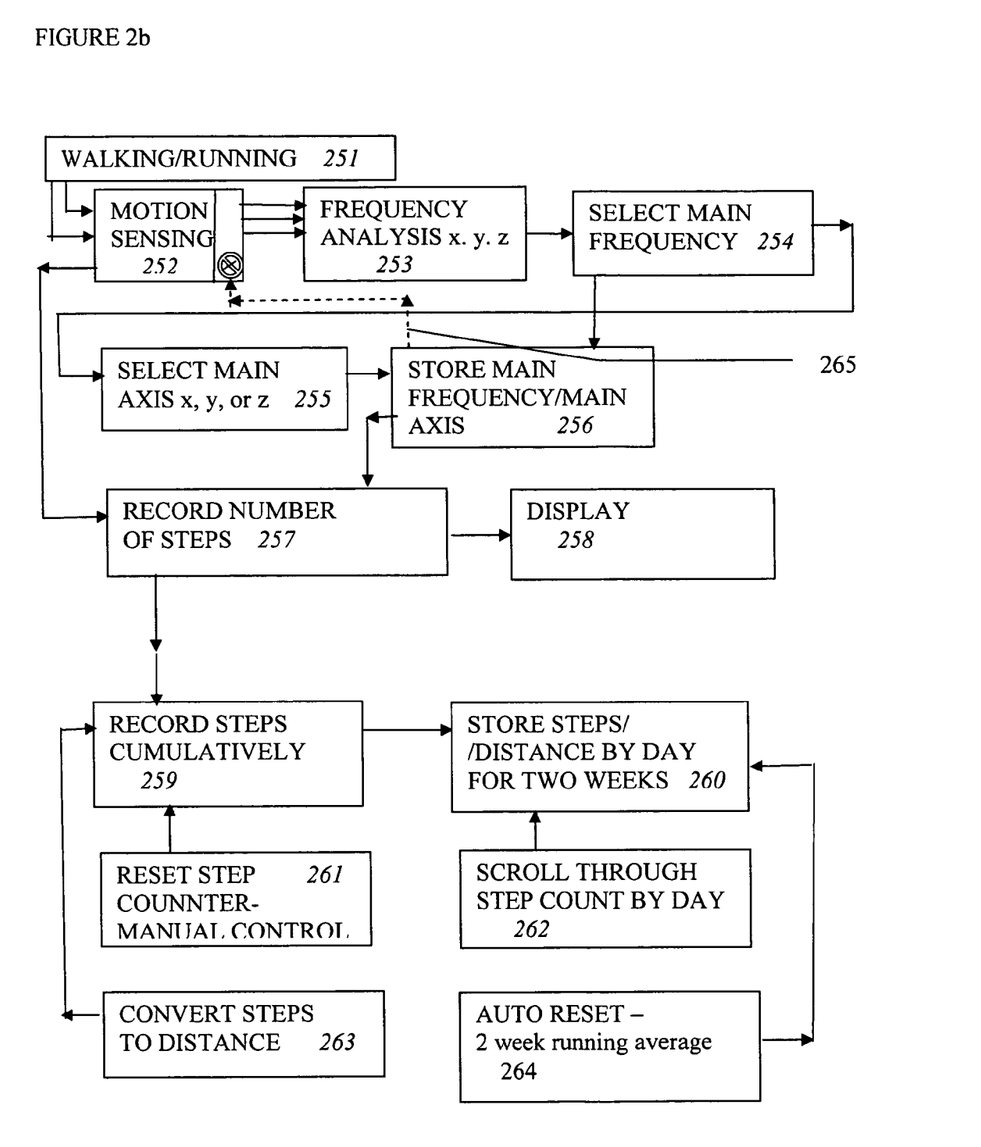
FIG. 2b shows a functional block diagram of the pet pedometer with exemplary functions.

FIG. 2b represents an activity flow diagram for an embodiment of the pet pedometer. The pet pedometer activity is activated by a motion induced into the pet pedometer by the walking or running 251 of the pet. The pet and its motions are not part of the pet pedometer invention; the pet's motion is detected by the first part of the invention, viz., a motion sensor which performs the motion sensing activity 252. The motion sensed by the motion sensing activity 252 is subjected to frequency analysis 253. A select main frequency activity is carried out on the motion-induced frequencies along three orthogonal axes, denoted x, y, and z. The dominant amplitude along the z-axis is determined by a comparison of the amplitudes associated with each frequency, as analyzed by the frequency analysis activity.

In an embodiment of the pet pedometer, the frequency analysis 253 is developed by utilizing a fast Fourier transform (FFT), either by a general purpose central processing unit (CPU), or by a more specialized area of an application specific integrated circuit (ASIC).

Once a dominant frequency for walking and running is auto-selected for the z-axis, the amplitudes corresponding to this dominant frequency are examined on the x-axis and the y-axis, where x-, y-, and z-axis form an orthogonal rectangular coordinate system. Utilizing the dominant frequency as determined by the z-axis Fourier analysis, a resultant vector at this dominant frequency is formed from the amplitudes on the x, y, and z-axes. This is the virtual vertical, for an embodiment of the pet pedometer. This is a vertical which accounts for any shift in the true virtual z-axis from the orientation of the z-axis in the 3-axis accelerometer. This virtual z-axis is the axis for accounting of steps, regardless of the actual orientation of the pet pedometer and so allowance is made if the actual pedometer is not in exact alignment, with z in the opposite direction to the Earth's gravitational field and the x and y axes are not in exact alignment in a plane perpendicular to the direction of the Earth's gravitational field.

The dominant or main frequency, as well as the direction of the virtual z-axis, relative to the three axes of the accelerometer, is stored by the store main frequency/main axis activity 256.

The accelerometer switches between a "walking mode" and a "running mode", depending upon which dominant frequency is detected. The distance traversed is then calculated by the number of steps times the walking stride length or the running stride length, depending upon the dominant mode detected.

After the store main frequency/main axis occurs, the motion sensor output is directed 265 to record number of steps 257 and to display the current number of steps 258.

The step display includes steps and distance in an embodiment of the pet pedometer. The number of steps/distance is recorded cumulatively 259 with conversion of steps to distance 263, while an auto-reset 261 or manual control 261 activity resets the cumulative counter, as desired. In an embodiment of the pet pedometer, steps/distances are recorded by day for two weeks 260. A manual scroll control 262 allows for scrolling through the current two-week running period. An auto-reset activity 264 deletes the trailing (oldest) day after 14 days of step/distance are accumulated. In an embodiment of the pet pedometer, a monthly steps/distance average is kept for a running 12 months, and a manual scroll control gives access to these saved monthly averages.

Figure 2C:
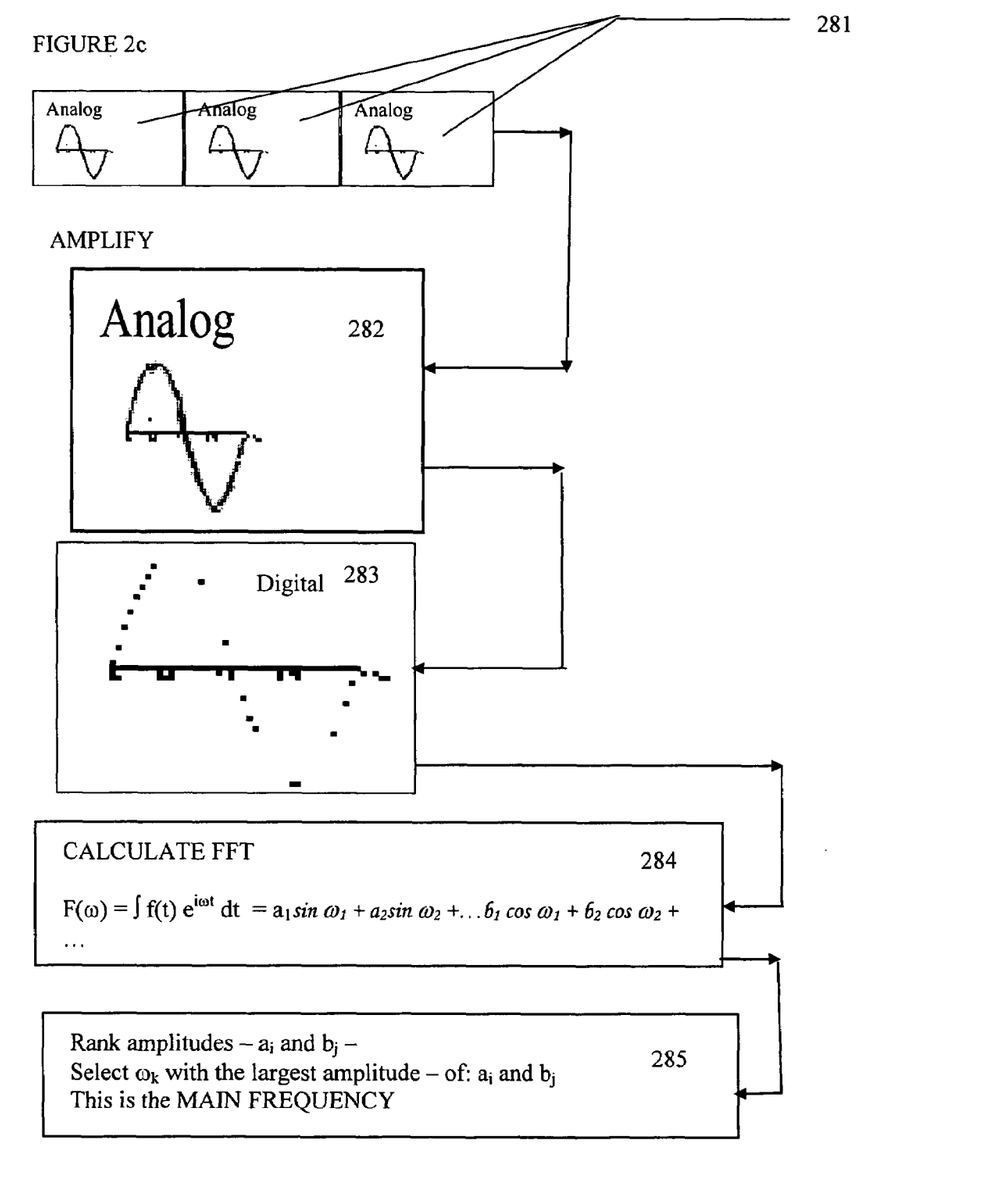
FIG. 2c shows exemplary physical functions which the pet pedometer may perform.

FIG. 2c shows the analog amplification 282 of the three analog accelerometer signals generated by the three-axes accelerometer. These signals are amplified 282 and converted to digital signals 283 by an analog to digital converter (A/D chip or A/D region on an ASIC). The fast Fourier transform 284 of the output from the digitized signal 283 is used to isolate the dominant frequency 285 in the z-direction (vertical) by ranking frequency amplitudes and selecting the largest or dominant or main frequency 285 for a walking pet and a running pet. The x- and y-main frequencies 285 are also determined so as to prevent a step being recorded if these x- and y-frequencies differ too much from the x- and y-main frequencies.

A review of how an accelerometer works indicates the feasibility of achieving a small, on chip, CMOS process, or silicon micro-machined accelerometer The applied acceleration of the casing causes the mass to move, and this motion can be used to determine the magnitude of the acceleration.

Figure 3A:
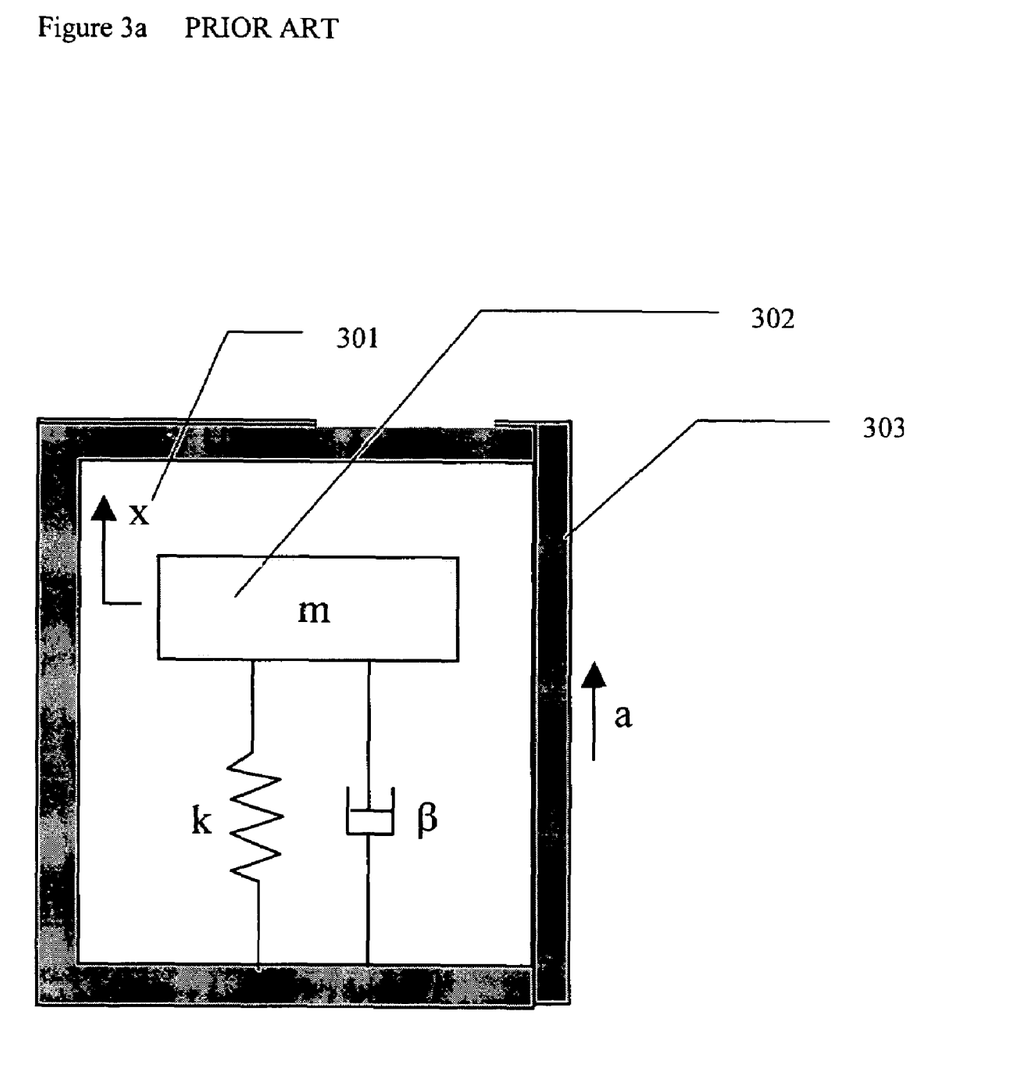
FIG. 3a, PRIOR ART, shows an exemplary single axis accelerometer.

Examining FIG. 3a, PRIOR ART, let x 301 be the displacement of the mass m 302 relative to the casing 303. When the casing 303 has acceleration a, the equation of motion for the mass 302 is $$m\ddot{x}+\beta\dot{x}+kx=-ma,$$

The behavior of this dynamic system is determined by two parameters: the natural frequency $\omega_n=\sqrt{k/m}$, and damping ratio $\zeta=\beta/\sqrt{4mk}$. Using these parameters, the equation of motion becomes $$\ddot{x}+2\zeta\omega_n\dot{x}+\omega_n^2 x=-a.$$

The solution to this equation consists of a transient response which depends on the specific initial conditions, and a steady-state response, which is independent of initial conditions. If the response of the system is sufficiently fast, it is reasonable to ignore the transient response. Focusing on the steady state response, we introduce two important performance parameters as follows.

Minimum detectable acceleration. Let the applied acceleration be a constant. The steady state response is then $x=a/\omega_n^2$. In other words, the steady-state net stretch or compression of the spring is directly proportional to the applied acceleration. Suppose that the minimum measurable spring deflection is $x_{min}$, then the minimum detectable acceleration of the accelerometer is given by $$a_{min}=x_{min}\omega_n^2.$$

Bandwidth. Let the applied acceleration be a sinusoid with circular frequency $\omega$, i.e., $a=a_0 \cos(\omega t)$. The steady-state deflection of the spring is of the form $x=x_0 \cos(\omega t+\phi)$. The deflection magnitude $x_0$ is related to the magnitude of the applied acceleration $a_0$ by $$x_0(\omega) = \frac{a_0}{\omega_n^2} \cdot \frac{1}{\sqrt{[(\omega/\omega_n)^2 - 1]^2 + 4\zeta^2(\omega/\omega_n)^2}}$$

As indicated by the notation, $x_0$ depends on the driving frequency $\omega$. In particular, $x_0$ becomes diminishingly small when $\omega$ is sufficiently large, and the accelerometer will cease to be useful for accelerations at such a frequency. In practice, the bandwith within which the accelerometer is useful is given by the cutoff frequency $\omega_c$. This frequency is defined by the equation $x_0 (\omega_c)/x_0(0)=1/\sqrt{2}$, and is given by $$\omega_c=\gamma\omega_n$$

where $$\gamma = \sqrt{1 - 2\zeta^2 + \sqrt{(1 - 2\zeta^2)^2 + 1}}.$$

Figure 3B:
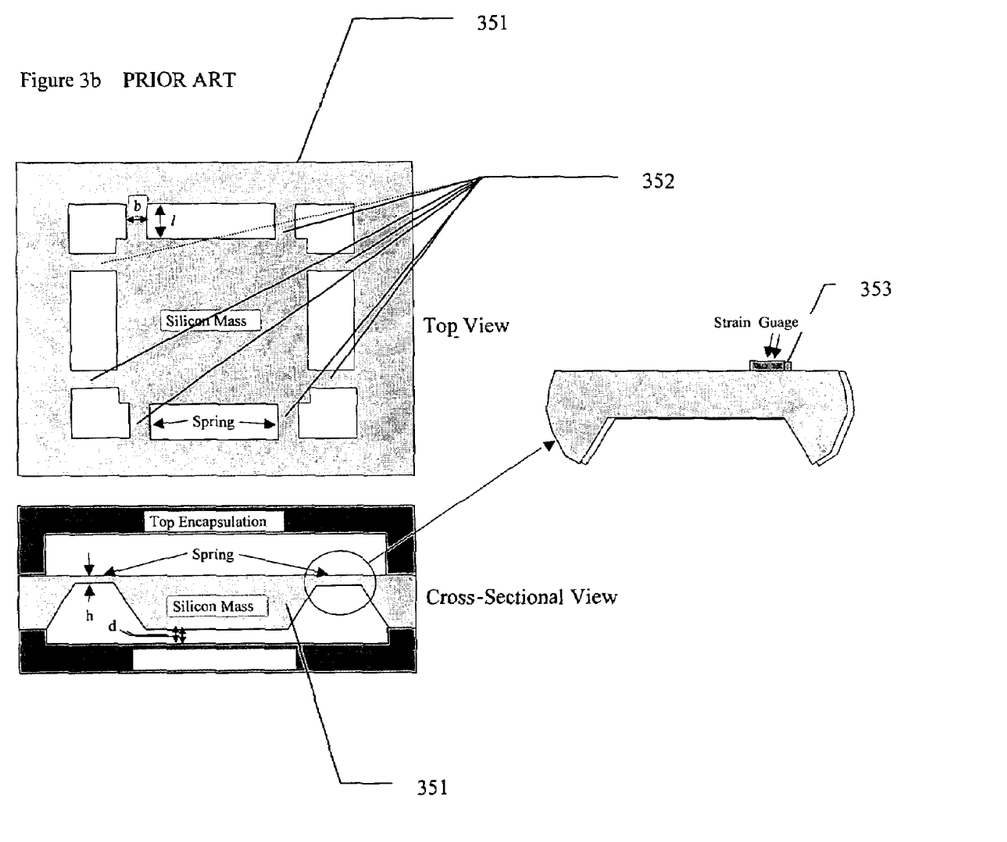
FIG. 3b, PRIOR ART, shows an exemplary micro-machined silicon accelerometer structure.
Figure 3C:
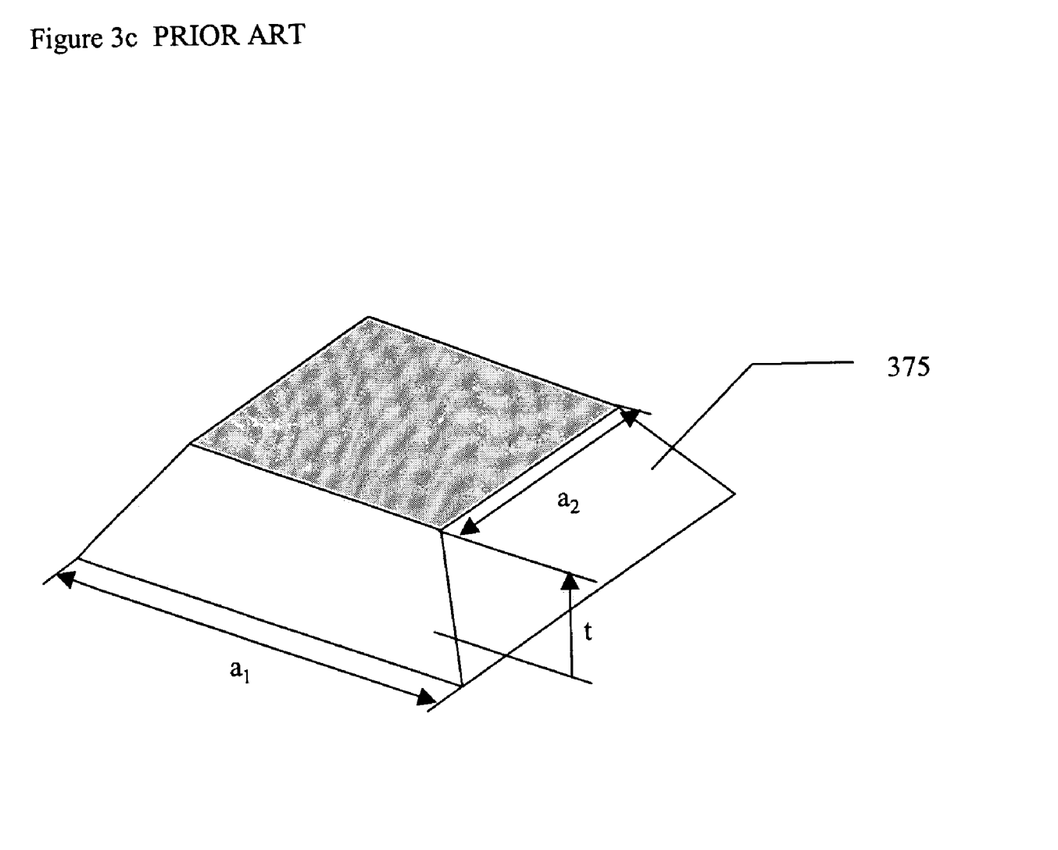
FIG. 3c, PRIOR ART, shows an exemplary micro-machined silicon mass structure.

As an example, we consider a micro accelerometer structure. The accelerometer has a configuration shown in FIG. 3b, PRIOR ART, (top and cross-sectional views). Using micromachining technology, the silicon mass 351 is shaped like a truncated pyramid 375, as shown in FIG. 3c, PRIOR ART. Note that the mass 375 is shown upside down for convenience in visualization.

By the nature of the micromachining process used, the edge lengths of the two horizontal surfaces of the silicon mass are $a_1$ and $a_2=a_1-t/\sqrt{2}$, where t is the thickness of the mass. The mass can be calculated from the formula $$m = \frac{1}{3}\rho t(a_1^3 - a_2^3)/(a_1 - a_2),$$

where $\rho=2300$ kg/m$^3$ is the density of silicon. As shown in FIG. 2b, the mass 351 is suspended by eight beams 352, which are also fabricated from silicon. Integrated strain gauges 353 are fabricated on the surface of each beam (at the end of the beam where strain due to bending achieves a maximum), and are used to measure the deflection of the beam. The damping in the sensor mainly arises from squeeze-film effects in the air gap between the silicon mass and the bottom encapsulation.

We can assess a micro accelerometer performance. As an example only, an accelerometer is to be designed to satisfy the following specifications: (1) the minimum detectable acceleration should be smaller than 0.02 g, where g is gravitational acceleration. We assume that the minimum measurable strain of the silicon beams allowed by the strain gauges is $\epsilon_{min}=5\times10^{-7}$; and (2) the bandwidth, given by the cutoff frequency for sinusoidal accelerations, should be greater than 4 kHz. Thus, the damping ratio should be in the range $0.6 \leq \zeta \leq 1.1$ so that the transient response of the accelerometer has desired characteristics.

We can choose, as an example only, some micro accelerometer design parameters which involve the selection of the following parameters. The dimensions of the silicon mass ($a_1$), the dimensions of the silicon beams (l, b, and h), and the depth (d) of the air gap between the silicon mass and the bottom encapsulation. These design parameters are to be chosen from the following practical ranges allowed by micromachining technology:

1 mm$\leq a_1 \leq$5 mm, 300 μm$\leq l \leq$600 μm, 100 μm$\leq b \leq$300 μm, 2 μm$\leq h \leq$10 μm, 5 μm$\leq d \leq$40 μm. Note that the thickness t of the silicon mass is given by that of the silicon wafer (525 μm) from which the accelerometer is fabricated.

Figure 4:
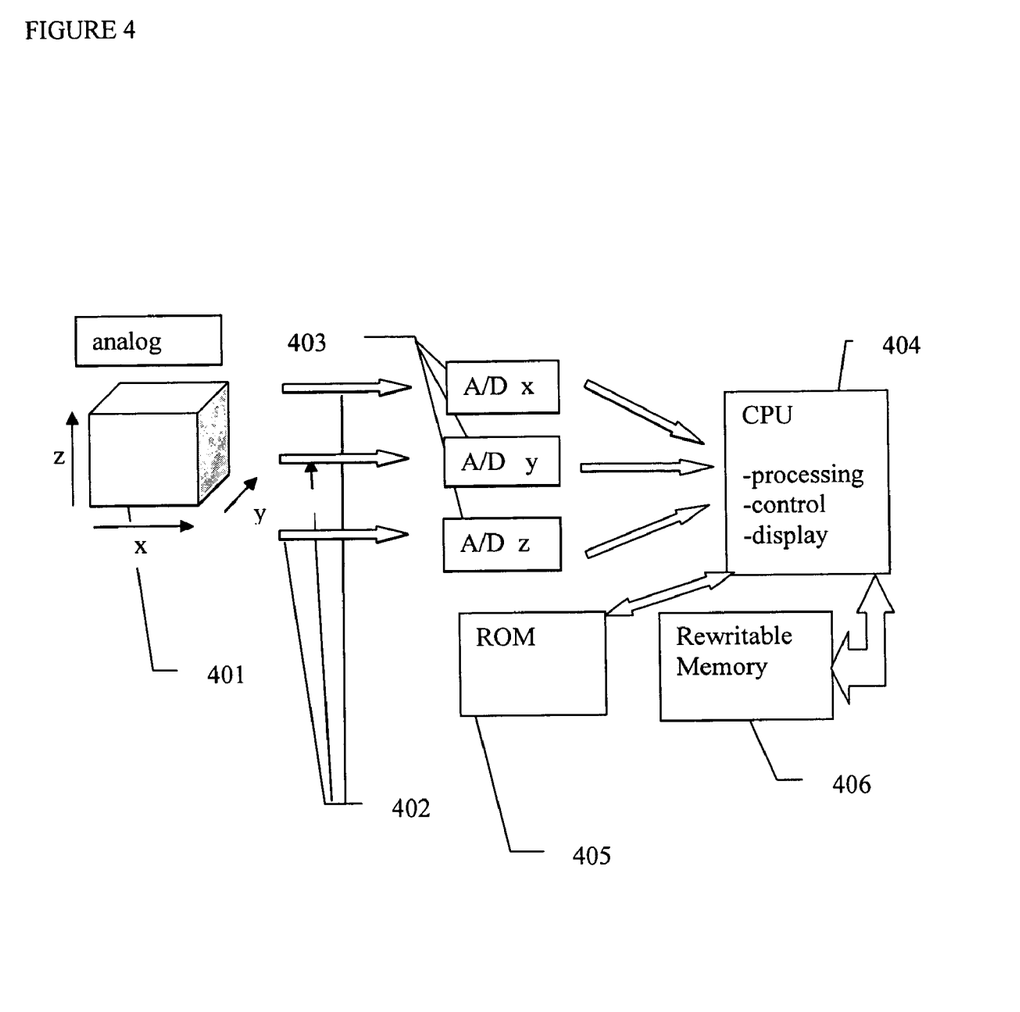
FIG. 4 shows analog signal output from the 3-axis accelerometer processed to yield dominant walking and running frequencies.

FIG. 4 shows an exemplary pet pedometer, in an embodiment of the pet pedometer, composed of a three-axes accelerometer unit 401, with amplifier chips 402, feeding into A/D chips 403, which in turn feeds a CPU 404 with both a read only memory ROM 405 and a rewritable memory 406, such as a RAM, or an EEPROM, or other solid state rewritable memory 406. A battery power source is present but not shown.

Figure 5:
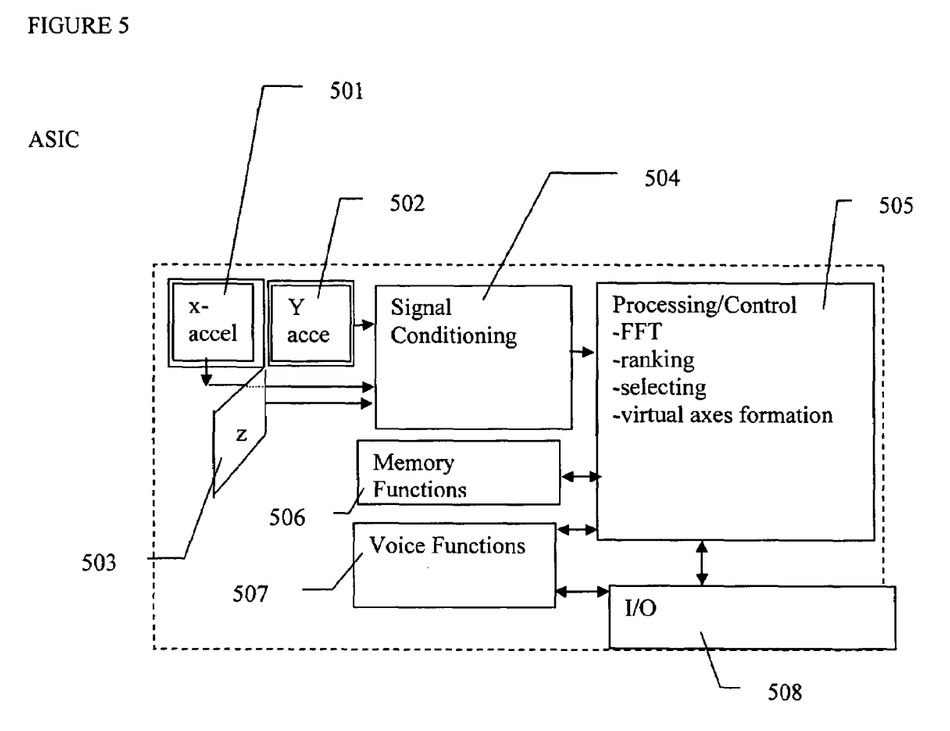
FIG. 5 shows an application specific integrated circuit encompassing major functional areas for the pet pedometer.

FIG. 5 shows an analogous version of a pet pedometer, in an embodiment of the pet pedometer, as different functional areas on an ASIC chip which is specifically designed to express most of the pet pedometer functions on a single application specific chip (ASIC). In FIG. 5, the x-axis 501, y-axis 502, and z-axis 503 accelerometers are shown as CMOS accelerometers, with signal conditioning 504, which includes amplification and digitization, a CPU/control area 505, together with a memory area 506, voice functions 507 (including voice storage and playback) and an input/output area (I/O) 508. A battery power source is present but not shown.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means and methods. The following description is of the best mode presently contemplated for carrying out the invention. This description is not to be taken in a limiting sense, but is merely made for the purpose of describing the general principles of and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention.

What is claimed is:

1. An attachable pet pedometer, for measuring a number of steps and distance traveled by a walking and running pet, comprising:
    a three-axes accelerometer;
    at least one amplifier wherein the amplifier amplifies analog output from the three-axes accelerometer;
    at least one analog-to-digital converter wherein the amplified analog signals are converted to digital signals;
    at least one central processing unit;
    at least one solid state digital memory device;
    at least one display;
    at least one manual control wherein the central processing unit may be accessed and the display may be varied;
    a central processor having at least one processor program, fixed in its solid state memory device wherein digital signal information which expresses a motion of the attachable pet pedometer in three-dimensions wherein this motion may be Fourier transformed into frequency space, from time space, and the amplitudes of different frequencies for each of three-dimensions can be ranked and maximum amplitudes timed wherein this information can be expressed as a number of "steps" or maximum amplitudes encountered by the attachable pet pedometer;
    at least one central processing unit program, fixed in the solid state memory device, wherein the output of the three-axes accelerometer is converted to a number of steps a pet has taken and wherein the display is operated to show said number of steps taken and equivalent distance; and
    an attachment device wherein the pet pedometer may be attached to a pet.

2. The attachable pet pedometer of claim 1, further comprising:
    a voice recording and playback device wherein a pet owner or other record his/her voice and said voice recording and playback device playback owner's voice or other voice wherein a pet hears said voice playback.

3. The attachable pet pedometer and playback device of claim 2 wherein music is recorded and played back to a pet.

4. The attachable pet pedometer of claim 1 wherein the dimensions of the pedometer are equal to or less than four inches by two inches by 0.5 inches.

5. The attachable pet pedometer of claim 1, further comprising:
    a solid state 3-axes accelerometer;
    at least one solid state amplifier chip;
    at least one solid state analog-to-digital chip;
    at least one fast Fourier chip;
    at least one central processor controller chip;
    at least one solid state memory chip; and
    at least one input/output solid state chip.

6. The attachable pet pedometer of claim 5 wherein said solid state expression takes the form of an application specific integrated circuit.

7. The attachable pet pedometer of claim 1, further comprising
    A manual reset control wherein a cumulative number of steps on the display may be reset to zero.

8. The attachable pet pedometer of claim 7 wherein said recording transducer and said playback transducer are the same transducer.

9. The attachable pet pedometer of claim 7 wherein said solid state expression takes the form of an application specific integrated circuit.

10. The attachable pet pedometer of claim 1, further comprising:
    a time and calendar timer;
    an auto-reset wherein the display is reset daily according to the timer; and
    number of steps recorded daily are transferred to a pet pedometer memory before said display is reset.

11. The attachable pet pedometer of claim 10, further comprising:
    a running storage of average steps per week for n weeks wherein n weeks may be 4 weeks or 8 weeks, or other n weeks, wherein a number of stored weekly averaged steps may be manually recalled to the display in a scrolling manner.

12. The attachable pet pedometer of claim 10, further comprising:
    a running storage of average steps per month for 12 months wherein a number of stored monthly averaged steps may be manually recalled to the display in a scrolling manner.

13. The attachable pet pedometer of claim 10 wherein said solid state expression takes the form of an application specific integrated circuit.

14. The attachable pet pedometer of claim 1, further comprising:
    a solid state chip-based voice recording and playback unit wherein at least one transducer acts to record a voice and at least one transducer acts to playback a voice.

15. A method of measuring a number of steps a pet has taken comprising:
    sensing a pet's movement by a three-axes accelerometer;

amplifying the analog output signals from the three-axes accelerometer;
converting the amplified analog signals to digital signals;
performing a Fourier transformation of the digital signals from time space to frequency space,
ranking amplitudes of the frequency components of the Fourier of a z-direction motion along a z-axis;
choosing a dominant frequency wherein said dominant frequency has the largest Fourier coefficient in frequency space and wherein said dominant frequency is stored in a pet pedometer memory;
choosing a dominant frequency for a pet's movement when a pet is walking;
storing said walking dominant frequency;
choosing a dominant frequency for a pet's movement when a pet is running;
storing said running dominant frequency;
ranking the amplitude of the Fourier analysis of an x-direction along an x-axis and of a e-direction motion along a y-axis;
forming a virtual vertical direction wherein a vector has components in the z-direction, the x-direction and the y-direction equal to or proportional to said dominant component amplitudes on each axis, respectively;
storing the virtual vertical direction;
periodically updating the virtual vertical direction and replacing the prior stored virtual vertical direction with an updated virtual vertical direction;
choosing dominant x-axis and y-axis frequencies;
not recording a step, when the virtual vertical direction shows a pet's walking or running dominant frequency wherein the x-axis and y-axis updated dominant frequencies differ substantially from their walking or running dominant frequencies;
detecting which dominant mode is present, walking or running, and utilizing the walking stride length or the running stride length in calculating distance traveled; and
displaying a cumulative number of steps and equivalent distance in real time.

16. The method of measuring the number of steps a pet has taken of claim 15, further comprising:
recording a voice; and
playing back the voice in a manner selected from the group consisting of: intermittently; continuously and repeating, and randomizing an order of discrete phrases.

17. The method of measuring the number of steps a pet has taken of claim 15, further comprising:
recording music; and
playing back music for a pet's enjoyment and/or training.

18. The method of measuring the number of steps a pet has taken of claim 15, further comprising:
Controlling a manual rest control wherein a cumulative number of steps on the display may be reset to zero.

19. The method of measuring the number of steps a pet has taken of claim 15, further comprising:
utilizing a time and calendar timer;
auto-resetting display wherein the display is reset daily according to the timer; and
recording number of steps daily wherein said number of steps is transferred to a pet pedometer memory before said display is reset.

20. The method of measuring the number of steps a pet has taken of claim 15, further comprising:
storing a running average of steps per week for n weeks wherein n weeks may be 4 weeks or 8 weeks, or other n weeks, wherein said number of stored weekly averaged steps may be manually recalled to the display in a scrolling manner.

21. A method for using a pet pedometer, comprising:
resetting a display of the pet pedometer to zero;
attaching the pet pedometer to a pet;
manually setting the pedometer display to "set walking" by scrolling through menu and selecting;
entering a fixed distance into the pedometer display by scrolling through values on the display and selecting a value;
walking a pet, with said pet pedometer attached, over the fixed distance;
manually setting the pedometer to "set running", by scrolling through menu and selecting;
running a pet over the same fixed distance;
manual resetting pedometer to "time", by scrolling and selecting;
selecting time, day, month, year by manual scrolling;
selecting manually resetting pedometer to "normal"; and
wherein such utilization of the pet pedometer allows for monitoring of a pet's activity and exercise facilitating a pet owner to better observe and maintain the exercise of a pet and allows a pet owner to ensure a pet receives enough exercise to maintain a pet's health.

* * * * *